United States Patent
Ferguson et al.

(10) Patent No.: US 7,447,761 B1
(45) Date of Patent: Nov. 4, 2008

(54) DEVICE DETECTION SYSTEM AND METHOD

(75) Inventors: David P. Ferguson, Berthoud, CO (US); Peter M. Maddocks, Ft. Collins, CO (US); Douglas Westley Rauenzahn, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1251 days.

(21) Appl. No.: 09/679,691

(22) Filed: Oct. 5, 2000

(51) Int. Cl.
*G06F 15/173* (2006.01)
*G06F 15/16* (2006.01)

(52) U.S. Cl. .................. 709/224; 709/203; 709/223

(58) Field of Classification Search .......... 709/203, 709/216, 223, 224, 227, 252, 253
See application file for complete search history.

(56) References Cited

U.S. PATENT DOCUMENTS

| | | | |
|---|---|---|---|
| 5,548,722 A | | 8/1996 | Jalalian et al. |
| 5,821,937 A | | 10/1998 | Tonelli et al. |
| 5,835,720 A | * | 11/1998 | Nelson et al. .......... 709/224 |
| 6,076,106 A | | 6/2000 | Hamner et al. |
| 6,101,555 A | * | 8/2000 | Goshey et al. .......... 719/321 |
| 6,324,656 B1 | * | 11/2001 | Gleichauf et al. .......... 714/37 |
| 6,359,557 B2 | * | 3/2002 | Bilder .................. 340/531 |
| 6,442,144 B1 | * | 8/2002 | Hansen et al. ............ 370/255 |
| 6,473,783 B2 | * | 10/2002 | Goshey et al. ........... 709/203 |
| 6,490,617 B1 | * | 12/2002 | Hemphill et al. ......... 709/223 |
| 6,714,974 B1 | * | 3/2004 | Machida ................. 709/223 |
| 6,718,378 B1 | * | 4/2004 | Machida ................. 709/223 |
| 6,772,204 B1 | * | 8/2004 | Hansen .................. 709/220 |
| 6,789,111 B1 | * | 9/2004 | Brockway et al. ........ 709/222 |
| 6,795,403 B1 | * | 9/2004 | Gundavelli ............. 370/256 |
| 6,795,846 B1 | * | 9/2004 | Merriam ................ 709/203 |

FOREIGN PATENT DOCUMENTS

EP 0854605 A2 7/1998

* cited by examiner

*Primary Examiner*—Ario Etienne
*Assistant Examiner*—Hussein Elchanti

(57) ABSTRACT

The present disclosure relates to a system and method for detecting devices connected to a network. The method comprises sending a scan request to a remote command process running on a remote network host, scanning the network host with the remote command process to determine if devices are connected to the host, and receiving a response to the scan request from the remote command process that indicates whether a device is connected to the network host. In a preferred arrangement, the remote command process sends a scan request to a host application program interface to receive device addresses. With these addresses, the remote command process requests information from the devices.

28 Claims, 4 Drawing Sheets

DEVICE DETECTION SYSTEM AND METHOD

FIELD OF THE INVENTION

The present disclosure relates to a device detection system and method. More particularly, the present disclosure relates to a system and method with which devices connected to various hosts of a network can be detected from a central control point.

BACKGROUND OF THE INVENTION

In most office settings, a plurality of computing devices or hosts are inter-connected through a network, for example, a local area network (LAN). Such hosts can include, for instance, personal computers (PCs), network servers, and the like. Normally, many or all of these hosts comprise devices that are directly connected to the hosts. Such devices can include, for example, disk drives, tape drives, tape libraries, modems, etc.

It is often useful for the network manager and/or technician to know what hosts are connected to the network and what devices are connected to these hosts. For instance, this information is useful in maintaining an inventory of the network devices. However, it can be difficult to keep track of all the devices connected to the network, particularly where the network is large and comprises many different hosts. Presently, the existence of such devices is determined by manually scanning each host of the network separately. Once each host has been scanned in this manner, the various devices can be located from a central point and, if desired, can be accessed for use from this central point or from another point in the network.

Clearly, the procedure described above can be time-consuming, especially where the network is large. Therefore, it would be desirable to have a system and method for detecting devices connected to the network from a central control point so as to simplify and at least partially automate the device detection procedure.

SUMMARY OF THE INVENTION

The present disclosure relates to a system and method for detecting devices connected to a network. The method comprises sending a scan request to a remote command process running on a remote network host, scanning the network host with the remote command process to determine if devices are connected to the host, and receiving a response to the scan request from the remote command process that indicates whether a device is connected to the network host. In a preferred arrangement, the remote command process sends a scan request to a host application program interface to receive device addresses. With these addresses, the remote command process requests information from the devices.

The device detection system typically comprises a controller process stored on a first network host, the controller process being configured to send a scan request to a remote network host, and a remote command process stored on a second network host, the remote command process being configured to receive the scan request sent by the controller process and initiate a scan of the second network host to determine whether devices are connected to the second network host. Preferably, the system further comprises a host lookup process that maintains an updated list of every network host that is running a remote command process.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
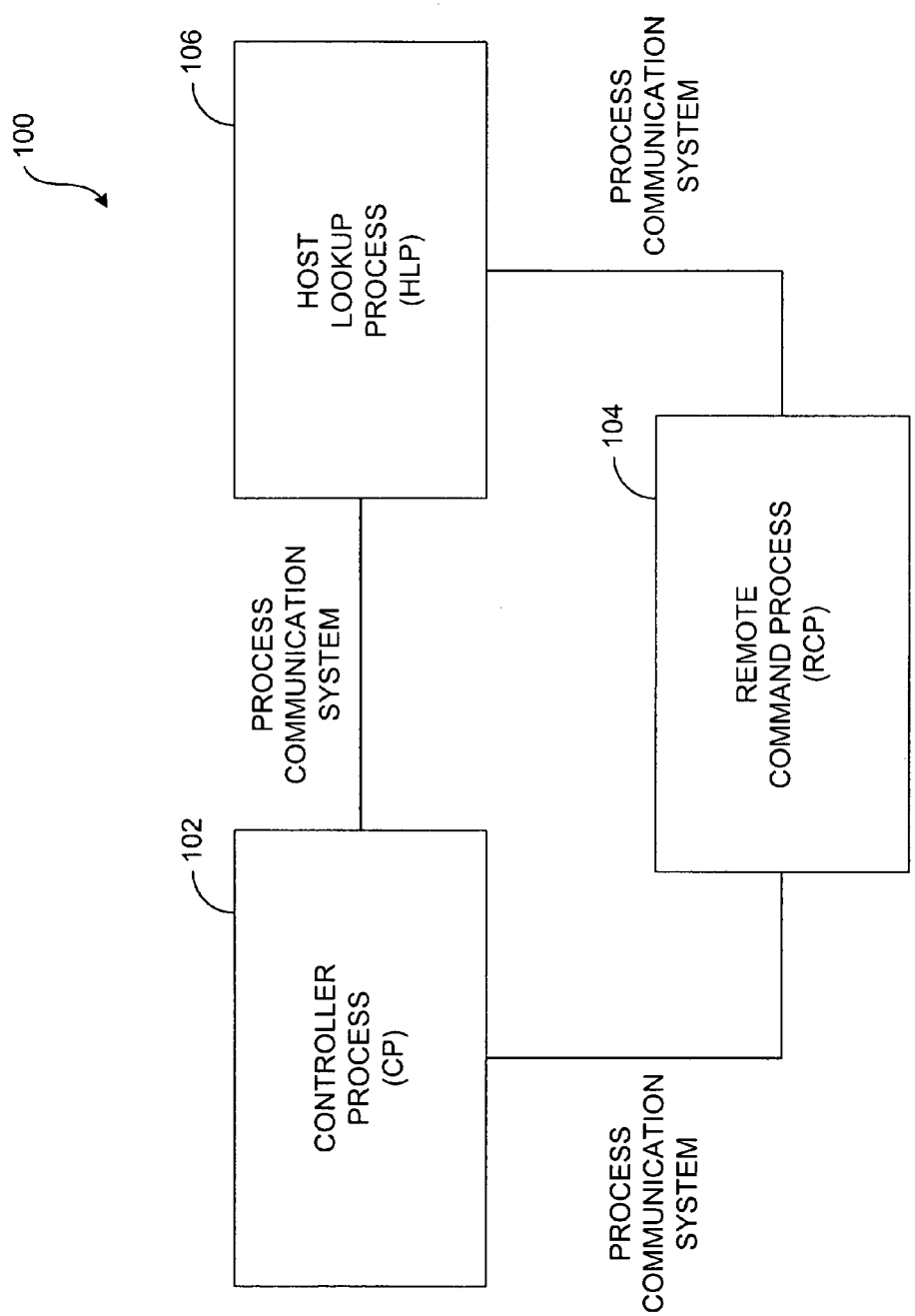
FIG. 1 is a schematic view of a device detection system of the present invention.

Referring now in more detail to the drawings, in which like numerals indicate corresponding parts throughout the several views, FIG. 1 illustrates a device detection system 100 of the present invention. Generally speaking, the device detection system 100 comprises a controller process (CP) 102, a remote command process (RCP) 104, and a host lookup process (HLP) 106. As will be appreciated from the discussion that follows, each of the processes identified in FIG. 1 can be implemented in software and/or hardware provided in one or more hosts of a network. Persons having ordinary skill in the art will understand that, where the processes are implemented in software, these processes can be stored and transported on any computer readable medium for use by or in connection with an instruction execution system, apparatus, or device, such that a computer-based system, processor containing system, or other system can fetch the instructions from the instruction execution system, apparatus, or device and execute the instructions.

In the context of this disclosure, a "computer readable medium" can be a means that can contain, store, communicate, propagate, or transport the program for use by or in connection with the instruction execution system, apparatus or device. A compute readable medium can be, for example, an electronic, magnetic, optical, electromagnetic, infrared, or semiconductor system, apparatus, device, or propagation medium. More specific examples of compute readable media include the following: an electrical connection having one or more wires, camera memory card, affordable computer diskette, a random access memory (RAM), a read only memory (ROM), an erasable programmable read only memory (EPROM or Flash memory), an optical fiber, and a portable compact disk read only memory (CD ROM). It is to be noted that the computer readable medium can even be paper or another suitable medium upon which the program is printed as the program can be electronically captured, via for instance optical scanning of the paper or other medium, then compiled, interpreted, or otherwise processed in a suitable manner if necessary, and then stored in a computer memory.

With reference to FIG. 1, the CP 102 serves as a central control point of the device detection system 100. Accordingly, the CP 102 normally comprises a user interface with which a user communicates with the device detection system 100. As will be apparent from the discussion that follows, the CP 102 is used to send commands to the various hosts of the network so that information regarding these hosts (e.g., the number and nature of devices connected to these hosts) can be retrieved and communicated to the user.

The RCP 104 comprises a process that is provided on at least each host that comprises devices to be detected. Normally, the RCP 104 is arranged as a service that continuously runs in the background of the host. Therefore, the RCP 104 normally runs in an idle state until called upon to scan the host to determine which devices are connected to the host. In particular, the RCP 104 normally is called upon to interface with the host upon receiving a scan request from the CP 102. In addition to scanning the host to detect devices, the RCP 104 further registers with the HLP 106. Normally, this registration initially occurs upon start-up of the RCP 104. Accordingly, when the RCP is initiated, the RCP sends a message to the HLP 106 to inform the HLP of the RCP's existence. In addition to this initial registration, the RCP 104 normally reconfirms its registration with the HLP 106 periodically (e.g., once every minute) such that its registration is periodically updated with the HLP.

The HLP 106 maintains a list of the registered RCPs 104 of the network. In use, the HLP 106 receives the registration messages from the RCPs 104 and registers the RCPs' existence. Due to the periodic reconfirmation of registration received from the RCPs 104, the HLP 106 normally maintains an up-to-the-minute inventory of the hosts within the network that include RCPs 104. The HLP 106 shares the information contained within the list with the CP 102 upon receiving requests for this information from the CP. Normally, the HLP 106 will time-out a host if the HLP does not receive a confirmation from the host's RCP 104 after a predetermined length of time. In particular, if a confirmation of an RCP's existence is not obtained after the expiration of this time period, the HLP 106 assumes that the RCP's host has shut down.

As indicated in FIG. 1, the CP 102 is connected to both the RCP 104 and the HLP 106 so that it can communicate to these processes. In addition, the RCP 104 is connected to the HLP 106 in like manner. As is further indicated in FIG. 1, each of these processes 102-106 communicate with a process communications system such as an interprocess communication system. Although this process communication system can take substantially any form, the system normally comprises one which can be used with substantially any operating system. One example of a suitable process communications system is remote method invocation (RMI) written in the JAVA language. As is known in the art, JAVA RMI® can be used with any operating system that is capable of running the JAVA Virtual Machine®. Other suitable systems include a Corba® based system and a DCOM based system.

Figure 2:
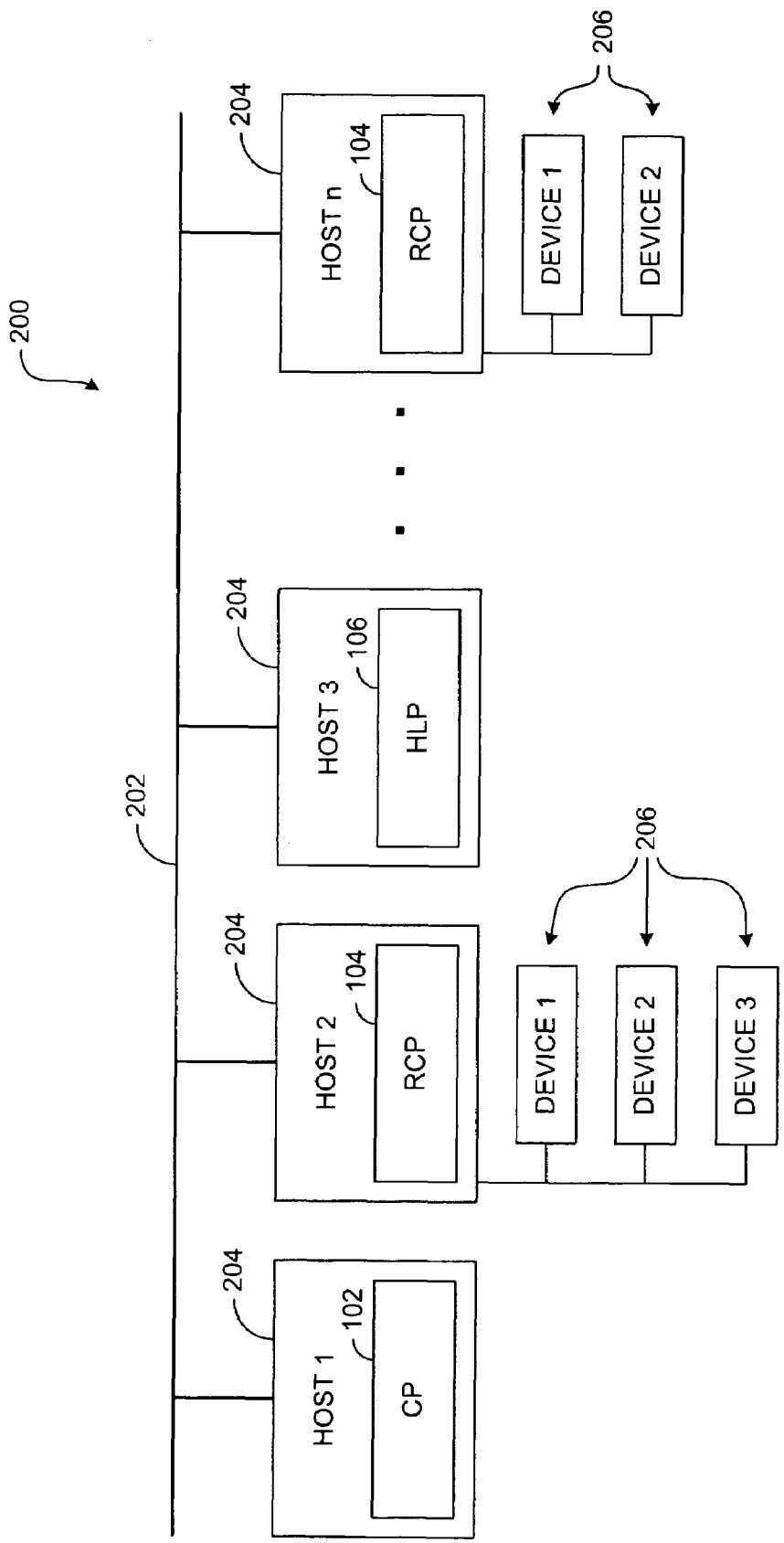
FIG. 2 is a schematic view of an example network in which the device detection system of FIG. 1 is used.

FIG. 2 illustrates an example network 200 in which the device detection system 100 can be used. As indicated in this figure, the network 200 comprises a network backbone 202 to which a plurality of hosts 204 are connected. Each host 204 comprises a computing device. By way of example, the hosts can comprise workstations, servers, or any equivalent computing device capable of connecting to the network 200. As indicated in FIG. 2, the network 200 can comprise any number of hosts 1 through n. By way of example, four hosts 204 are depicted in FIG. 2, i.e., Host 1, Host 2, Host 3, and Host n. As will be appreciated by persons of ordinary skill in the art, each of the hosts 204 operate with an operating system stored therein. The particular type of operating system running on each host 204 is not significant to proper operation of the device detection system 100. Accordingly, the network 200 can comprise a heterogeneous network in which many different operating systems are used by the network hosts 204. By way of example, the hosts can be operating a Windows® system, a Linux® system, an HP-UX® system, a Solaris® system, or the like.

As indicated in FIG. 2, each of the hosts 204 can comprise a process of the device detection system 100 shown in FIG. 1. Accordingly, by way of example, Host 1 comprises the CP 102, Host 3 comprises the HLP 106, and Hosts 2 and n comprise RCPs 104. Although a particular correlation between the various hosts 204 and the processes 102-106 is illustrated in FIG. 2, it is to be understood that these locations are exemplary only. In fact, a single host 204 of the network 200 can, optionally, comprise each of the CP 102, RCP 104, and HLP 106, if desired. Normally however, each host 204 within the network 200 will know the location of the HLP 106 such that each host comprising an RCP 104 is capable of registering with the HLP and the CP 102 can locate the HLP when sending a host list request.

With further reference to FIG. 2, Host 2 and Host n comprise devices 206 that are directly connected to these hosts. By way of example, these devices 206 are connected to their respective hosts 204 with a common connection protocol such as small computer system interface (SCSI). Alternatively, the devices 206 can be connected to the host 204 with fiber channel technology. By way of example, each device 206 can comprise disk drive, tape drive, tape library, modem, or substantially any other device commonly connected to a network host. Typically, each host 204 is equipped with an application program interface (API) that is capable of scanning the host bus to determine the addresses of the various devices 206 that are connected to it.

Figure 3:
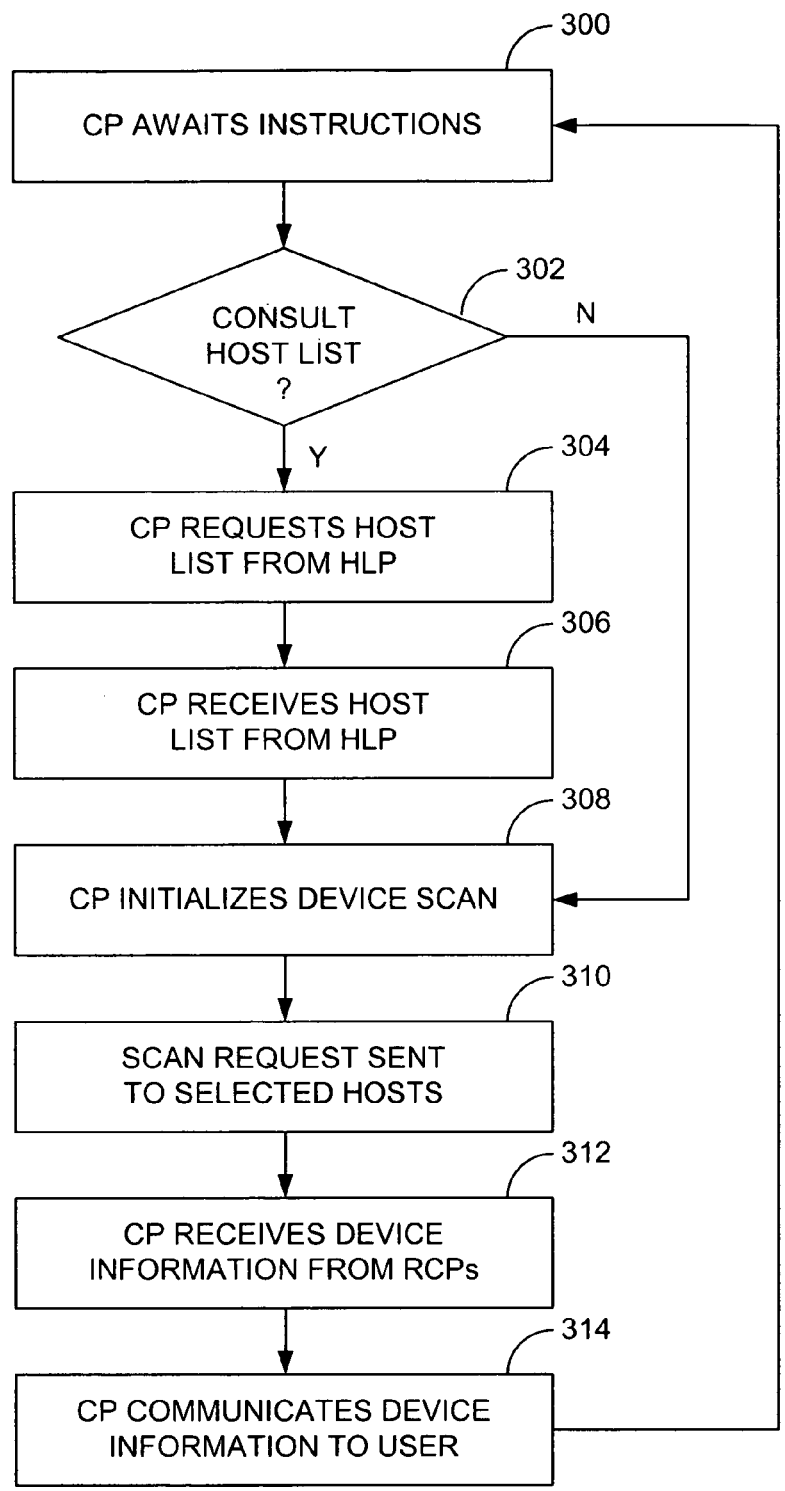
FIG. 3 is a flow diagram of a method for detecting devices connected to a network from a central control point.

FIG. 3 illustrates a method for detecting devices across a network such as that illustrated in FIG. 2. In particular, FIG. 3 illustrates the use of the CP 102 of the device detection system 100 in communicating with the RCP 104 and LCP 106 of the system to locate and obtain information about these devices. As indicated in block 300, the CP 102 awaits instructions from, for example, a user of the system. Normally, the CP 102 is located at a central control workstation that is convenient to the user. As indicated at 302, it is first determined whether the CP 102 will obtain host information prior to conducting the device detection. Normally, this determination is made by the user in requesting the device detection. However, this determination could, alternatively, be made by the CP 102 if the CP is pre-programmed for automatic device detection. If the host list is to be consulted prior to conducting the device detection, flow continues to block 304 where the CP 102 requests the host list from the HLP 106. As identified above, the CP 102 communicates with the HCP 106 through the process communication system (FIG. 1).

Once the host list request has been delivered to the HLP 106, the HLP transmits the list to the CP 102 and the host list is received by the CP as indicated in block 306. Once the hosts to be scanned have been identified, the CP 102 initializes a device scan across the network as indicated in block 308. Where the host list is not to be consulted prior. to conducting the device scan, i.e., where the CP 102 or the user already knows which hosts to scan without the list, flow continues from 302. directly to block 308.

Figure 4:
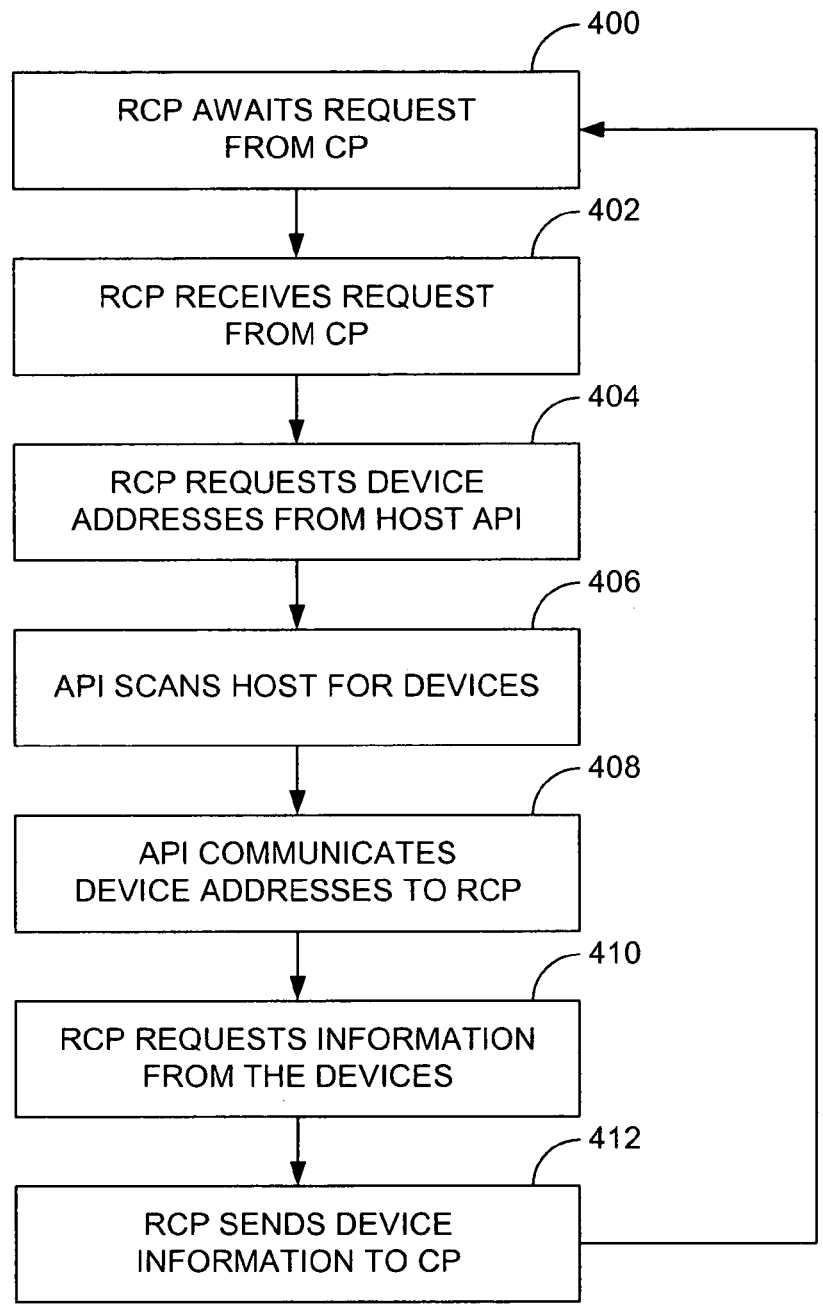
FIG. 4 is a flow diagram of a method for detecting devices connected to a particular host.

The CP 102 sends scan requests to each of the selected hosts as identified in block 310. Normally, the scan requests are issued from the CP 102 to the various RCPs 104 in parallel. In particular, a thread (i.e., a flow of execution within a process) can be directed to each RCP 104 that is to be scanned for devices. FIG. 4 illustrates a method for detecting devices connected to a particular host with an RCP 104. In particular, this figure illustrates the device detection steps involved when a scan request is received. As indicated in block 400, the host RCP 104 awaits the scan request from the CP 102. Once a scan request is received from the CP 102 as indicated in block 402, the RCP 104 requests device address information from the API of its host as indicated in block 404. At this point, the API performs a device scan of the host, as indicated in block 406, to determine the addresses of the devices, if any. Once the addresses have been determined, the API communicates the device addresses to the RCP 104 as indicated in block 408. The RCP 104 then uses these addresses to obtain information about the various devices connected to the host. In particular, the RCP 104 requests information as to the device name and type from the device as indicated in block 410. After obtaining this information, the RCP 104 can send this information to the CP 102 as indicated in block 414. At this point, flow can return to block 400, and the RCP 104 can again await a scan request from the CP 102.

Once some or all of the device detection information has been collected by the CP 102, this information can be communicated to the user, as indicated in block 314 with, for instance, the control point host (Host 1 in FIG. 2). By way of example, this information can be transmitted to the user in tabular form and can include the names of the devices, the types of the devices, the hosts to which these devices are connected, and the device addresses of the devices. At this point, the CP 102 and the user interfacing with the CP will know the number, location, and type of each device connected to the network 200. Flow can then return to block 300 and the CP 102 can again await instructions as identified above. With the device information, the various devices can be accessed through conventional methods so that they can be used remotely. For instance, where a particular device is a storage device, the device can perform a "write" function so that information transmitted to the host to which the device is connected can be stored by the device.

While particular embodiments of the invention have been disclosed in detail in the foregoing description and drawings for purposes of example, it will be understood by those skilled in the art that variations and modifications thereof can be made without departing from the spirit and scope of the invention as set forth in the following claims.

What is claimed is:

1. A method for detecting devices connected to a network, comprising:
   sending in parallel multiple scan requests from a client computer to remote command processes running on multiple remote network hosts;
   scanning each remote network host with the remote command processes to identify peripheral devices that are directly connected to the remote network hosts;
   receiving with the client computer responses to the scan request from the remote command processes that identify the peripheral devices that are connected to the various remote network hosts and that provide network addresses of the peripheral devices;
   the client computer requesting information about the peripheral devices directly from the peripheral devices via communications sent to the received network addresses; and
   the client computer receiving information about the peripheral devices directly from the peripheral devices, that information facilitating use of the peripheral devices by the client computer.

2. The method of claim 1, wherein a controller process on the client computer is used to send the scan request to the remote command process.

3. The method of claim 1, wherein scanning the remote network hosts with the remote command processes comprises the remote command processes sending scan requests to host application program interfaces (APIs) resident on the remote network hosts that are configured to scan the remote network hosts for peripheral devices.

4. The method of claim 1, further comprising maintaining an updated list of each remote network host running a remote command process with a host lookup process.

5. The method of claim 4, further comprising consulting the list prior to sending the scan requests.

6. The method of claim 1, further comprising communicating information concerning the identified peripheral devices to a user of the client computer.

7. The method of claim 1, wherein the peripheral devices comprise at least one of a disk drive, a tape drive, a tape library, and a modem.

8. A device detection system for detecting devices connected to a network, comprising: a processor, a memory
   means for sending multiple scan requests in parallel to remote command processes running on multiple remote network hosts;
   means for scanning the remote network hosts with the remote command processes to identify peripheral devices that are directly connected to the remote network hosts;
   means for receiving responses to the scan requests from the remote command processes that identify the peripheral devices that are connected to the remote network hosts and that provide network addresses of the peripheral devices;
   means for requesting information about the peripheral devices directly from the peripheral devices via communications sent to the received network addresses; and
   means for receiving information about the peripheral devices directly from the peripheral devices, that information facilitating remote use of the peripheral devices.

9. The system of claim 8, wherein a controller process is used to send the scan requests to the remote command processes.

10. The system of claim 9, wherein the controller process runs on a network host.

11. The system of claim 8, wherein the means for scanning the remote network hosts with the remote command processes comprises means for sending scan requests from the remote command processes to host application program interfaces (APIs) resident on the remote network hosts that are configured to scan the remote network hosts for peripheral devices.

12. The system of claim 8, further comprising means for maintaining an updated list of each remote network host running a remote command process with a host lookup process.

13. The system of claim 12, further comprising means for consulting the list prior to sending the scan requests.

14. The system of claim 8, further comprising means for communicating information concerning the identified peripheral devices to a user.

15. The system of claim 8, wherein the peripheral devices comprise at least one of a disk drive, a tape drive, a tape library, and a modem.

16. A device detection system for detecting devices connected to a network, comprising a memory that stores a logic which when executed perform the steps comprising:
   sending multiple scan requests in parallel to remote command processes running on multiple remote network hosts;

scanning the remote network hosts with the remote command processes to identify peripheral devices that are directly connected to the remote network hosts; and receiving responses to the scan requests from the remote command processes that identify the peripheral devices that are connected to the network hosts and that provide network addresses of the peripheral devices;

requesting information about the peripheral devices directly from the peripheral devices via communications sent to the received network addresses; and receiving information about the peripheral devices directly from the peripheral devices, that information facilitating remote use of the peripheral devices.

17. The system of claim 16, wherein a controller process is used to send the scan requests to the remote command processes.

18. The system of claim 17, wherein the controller process runs on a network host.

19. The system of claim 16, wherein the logic configured to scan the remote network hosts with the remote command processes comprises logic configured to send scan requests from the remote command processes to host application program interfaces (APIs) resident on the remote network hosts that are configured to scan the remote network hosts for peripheral devices.

20. The system of claim 16, further comprising logic configured to maintain an updated list of each remote network host running a remote command process with a host lookup process.

21. The system of claim 20, further comprising logic configured to consult the list prior to sending the scan requests.

22. The system of claim 16, further comprising logic configured to communicate information concerning the identified peripheral devices to a user.

23. The system of claim 16, wherein the peripheral devices comprise at least one of a disk drive, a tape drive, a tape library, and a modem.

24. A device detection system for remotely detecting devices connected to a network, comprising: multiple remote network hosts multiple remote command processes running on said multiple remote network hosts, the remote command processes being configured to receive the scan requests sent by a controller process and, responsive to those scan requests, initiate scanning of the remote network hosts to identify peripheral devices that are directly connected to the remote network hosts, receive results from the scanning that identify the peripheral devices and their network addresses, and provide the results to the controller process; and a controller process running on a client computer, the controller process being configured to send multiple scan requests in parallel to the multiple remote network hosts, receive the scanning results from the remote command processes, and directly communicate with the Peripheral devices via the received network addresses to obtain information from the peripheral devices that will facilitate use of the peripheral devices by the client computer.

25. The system of claim 24, further comprising a host lookup process that maintains an updated list of every remote network host that is running a remote command process.

26. The system of claim 25, wherein the host lookup process runs on the client computer.

27. The system of claim 25, wherein the host lookup process runs on one of the remote network hosts.

28. The system of claim 24, wherein the peripheral devices comprise at least one of a disk drive, a tape drive, a tape library, and a modem.

* * * * *

UNITED STATES PATENT AND TRADEMARK OFFICE
CERTIFICATE OF CORRECTION

| | | |
|---|---|---|
| PATENT NO. | : 7,447,761 B1 | Page 1 of 1 |
| APPLICATION NO. | : 09/679691 | |
| DATED | : November 4, 2008 | |
| INVENTOR(S) | : David P. Ferguson et al. | |

It is certified that error appears in the above-identified patent and that said Letters Patent is hereby corrected as shown below:

On the Title page, in field (75), in "Inventors", in column 1, line 3, delete "Westley" and insert -- Wesley --, therefor.

In column 8, line 9, in Claim 24, after "receive" delete "the".

In column 8, line 21, in Claim 24, delete "Peripheral" and insert -- peripheral --, therefor.

Signed and Sealed this

Thirteenth Day of July, 2010

David J. Kappos
*Director of the United States Patent and Trademark Office*